Oct. 8, 1940.    J. B. JACKSON ET AL    2,217,412
DEVICE FOR REMOVING STARFISH AND OTHER PARASITES FROM MOLLUSK BEDS
Original Filed May 20, 1937    2 Sheets-Sheet 1
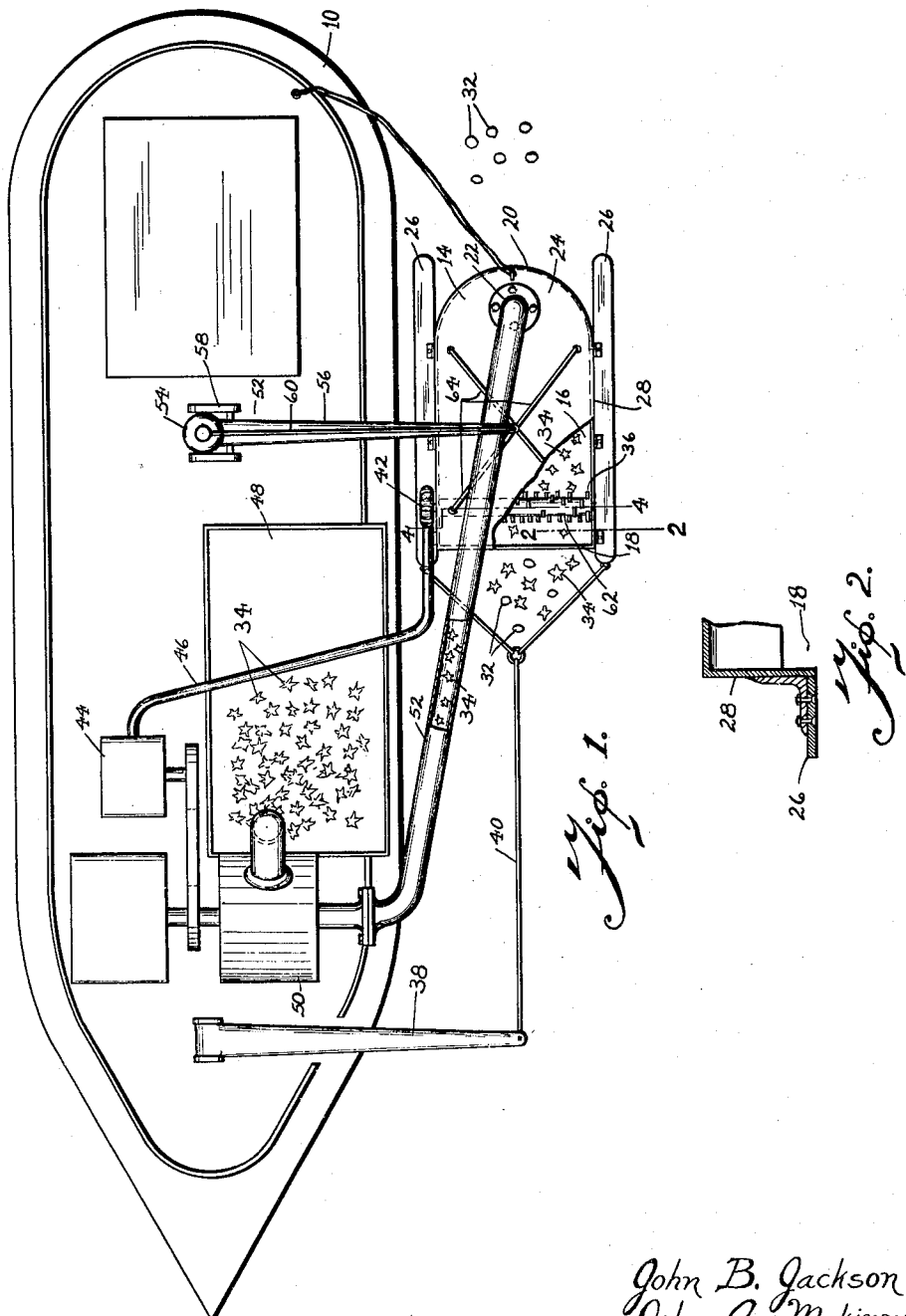
John B. Jackson
John A. McKinnon
INVENTORS
BY Thomas A. Jenches
ATTORNEY

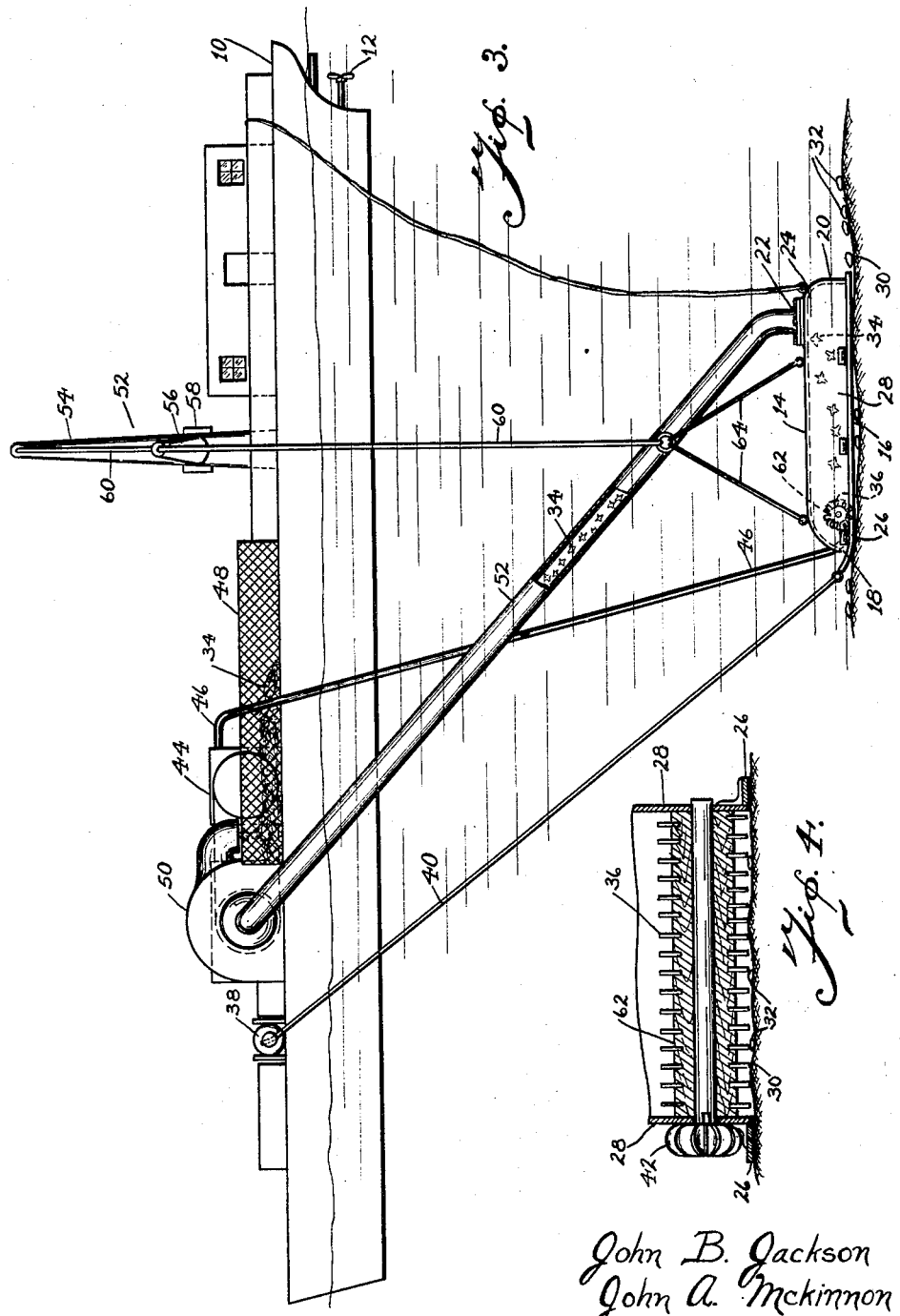

Patented Oct. 8, 1940

2,217,412

UNITED STATES PATENT OFFICE 2,217,412

DEVICE FOR REMOVING STARFISH AND OTHER PARASITES FROM MOLLUSK BEDS

John B. Jackson and John A. McKinnon, Providence, R. I.

Application May 20, 1937, Serial No. 143,778
Renewed March 8, 1940

11 Claims. (Cl. 43—4)

Our invention relates to an improved apparatus for removing starfish, borers and other types of mollusk destructive marine organisms and parasites from bivalve mollusk beds, such as oyster beds, clam beds, scallop beds, quahaug beds, muscle beds, etc.

An object of our invention is to provide suitable means adapted to be continuously towed by a continuously moving vessel over such a mollusk bed by said vessel to provide a continuous suction passage sweeping over said mollusk bed and extending from said mollusk bed to the moving vessel.

A further object of our invention is to provide the combination with such a suction passage of means to continuously agitate the mollusk bed adjacent said suction passage, in our preferred embodiment, preferably comprising brush means rotatably mounted on said towable means and operated by peripheral contact thereof with said mollusk bed as said means is towed to brush the parasites from the mollusk bed and throw them into the path of the continuous suction passage.

A further object of our invention is to provide in further combination therewith means to positively supplementally revolve said brush means from said vessel to insure that the parasites will be brushed from the mollusk bed and positively thrown in the path of the suction passage.

These and such other objects of our invention as may hereinafter appear will be best understood from a description of an embodiment thereof, such as is shown in the accompanying drawings.

In the drawings,

Fig. 1 is a plan view of our improved device for removing parasites from mollusk beds having parts thereof mounted on a movable towing vessel.

Fig. 2 is a sectional view taken along the line 2—2 of Fig. 1.

Fig. 3 is a side elevation of the device shown in Fig. 1 in association with said movable towing vessel.

Fig. 4 is a vertical sectional view taken along the broken line 4—4 of Fig. 1.

In the drawings, wherein like characters of reference indicate like parts throughout, 10 generally indicates a movable towing vessel in association with and from which various parts of our improved device may be operated. We preferably employ a self-movable towing vessel provided with a suitable engine for rotating the propeller 12 thereof and preferably of shallow depth so as to be readily movable into shallow waters where mollusk beds are often located.

As stated, an object of our invention is to provide an improved apparatus for continuously removing parasites from mollusk beds, which continuously suck said parasites to a vessel passing thereover, it being our belief that we are the first to provide an apparatus for continuously sucking parasites from mollusk beds to a vessel passing thereover with or without agitation of said parasites on said mollusk beds. While any suitable type of agitation may be employed, we preferably create a continuous suction passage from said mollusk bed to said vessel and positively brush the parasites from the mollusk bed into said suction passage, whereby they may be sucked from said mollusk bed to said vessel, preferably by positively rotating said brush from said vessel at a greater speed than the peripheral speed thereof caused by contact thereof with said mollusk bed to positively throw said parasites from said mollusk bed towards said suction passage for removal to said vessel. As stated hitherto, our invention is capable of operating on any type of a bivalve mollusk bed, such as a clam bed, scallop bed, quahaug bed or muscle bed, but is particularly adapted for use for removing starfish, bores or other parasites from oyster beds.

Our improved device includes a preferably oblong hood 14 having an open bottom 16 and an open front end 18, a preferably curved rear end 20 and a suction hole 22 therein, preferably in the top 24 thereof adjacent the rear end 20. We preferably provide means mounted on each side of said hood permitting the ready towing thereof over the mollusk bed, in our preferred embodiment comprising the metal runners 26 mounted on the lower ends of the side walls 28 thereof for movement over the mollusk bed 30 having the mollusks 32 thereon and having the starfish 34 and other parasites attaching said mollusks 32. As our preferred type of agitating means, we provide a brush 62 having the spaced aligned bristles 36, preferably flexible bristles, such as rattan, mounted transversely in suitable bearings behind the front end 18 of said hood 14, the ends of the bristles 36 preferably being in peripheral contact with said mollusk bed 30. The movable towing vessel 10 is provided with suitable means for towing said hood 14 therefrom, preferably at a spaced distance therefrom, said means in our preferred embodiment comprising the towing out-rigger boom 38 mounted on the bow of said vessel 10 and adapted to project horizontally from one side of the bow in use and a towing line 40 extending from the end of said boom to the front end of said hood 14. We also provide means operable from said vessel 10 for positively rotating said brush, in our preferred embodiment said means comprising a water motor, preferably a turbine 42 mounted on said hood, a water pump 44, preferably a centrifugal water pump mounted on the deck of the vessel and flexible pipe means 46 connecting said water pump 44 on said vessel with said water motor 42 on said hood to provide water in a suitable stream for revolving the blades of the water turbine to cause rotation of the brush 62 mounted on a common shaft with said turbine, although if desired gearing means may be interposed between said turbine and brush shaft if greater peripheral speed be desired. The vessel 10 is also provided with a suitable parasite storage receptacle 48, preferably mounted on the deck thereof and suitable means are provided to create or provide a suction passage between said hood 14 and vessel 10, in our preferred embodiment comprising a preferably centrifugal suction pump 50 mounted on the deck of said vessel and pipe means 52 connecting said hood suction hole 22 to said centrifugal suction pump 50 to continuously provide a suction passage leading from said hood to the storage reservoir 48 on the deck of said vessel 10. If it is desired to lift and store the hood 14 on the deck of a vessel, a suitable crane 52 may be provided having a suitable mast 54 projecting upwardly from the deck of said vessel, a crane boom 56 pivotally mounted thereon, a suitable winch 58 for raising and lowering said boom through the medium of the rope 60 permitting the lowering of the hood 14 to the mollusk bed, said rope means being of cradle shape 64 near the lower end thereof to provide a 4-point attachment to said hood to maintain it in a horizontal position at all times. It is thus obvious that by suitable manipulation of the winch 58 and rope 60 the hood 14 may be lifted from the deck of the vessel and lowered in position on the mollusk bed and maintained in a towing position immediately in rear of the end of the outrigger boom 38 and spaced from said vessel 10.

When it is desired to operate our improved device, the hood 14 is lowered in a position to be towed over the mollusk bed, the outrigger boom 38 being simultaneously lowered for this purpose. The towing vessel is then propelled forward tending to tow or drag the hood 14 over the water bottom and hence over the mollusk bed. When the device is adjacent a mollusk bed, the centrifugal pump 50 is started up thus creating a continuous suction passage from said hood 14 through said pipe 52 to said centrifugal pump 50 discharging on the parasite receptacle or bin 48 on the deck of the vessel. It is obvious that the brush 62 will be rotated by peripheral contact of the ends of the bristles thereof with the mollusk bed due to the towing motion of the vessel 10. We have found in practice, however, that it is desirable to supplementally positively rotate said brush means 62 to provide additional agitation to positively remove the parasites from the mollusk bed and therefore the water pump 44 may be started up to pump water down the supplemental flexible pipe 46 to operate the turbine water motor 42 to positively supplementally rotate the brush means 62. Thus as the hood is towed, the starfish 34 or other parasites feeding on the mollusks in the mollusk bed will be drawn through the front end of the hood and positively agitated, brushed and tossed by the positively revolved brush 62 as shown in Fig. 3 to the rear end of said hood in the path of said suction passage 52 to be drawn upwardly therethrough by said centrifugal pump to be discharged in the parasite receptacle 48 on the deck of the vessel. It is obvious that whenever desired the crane 52 may be readily operated to raise the hood 14 from a position on the mollusk bed to the deck of the vessel, the flexible suction pipe 52 readily bending for this purpose and the connections joining each end thereof supplementally rotating if desired.

It is thus obvious that we have provided a novel device for removing parasites from mollusk beds with the advantages explained above.

It is thus obvious that our invention is not limited to the specific embodiment shown and that various deviations may be made therefrom without departing from the spirit and scope of the appended claims.

What we claim is:

1. A device for removing starfish and other parasites from mollusk beds, comprising an oblong hood having an open bottom portion and an open front end, a curved rear end and a suction hole in the top thereof adjacent said rear end, runners mounted on the lower ends of each side wall thereof for movement over the mollusk bed, a brush rotatably mounted transversely behind the front end thereof in peripheral contact with said mollusk bed and a water motor for positively rotating said brush mounted thereon, a movable towing vessel having a towing outrigger boom projecting horizontally from one side of the bow thereof, a parasite storage receptacle thereon, a centrifugal suction pump, a water pump and a crane mounted thereon, said crane having rope means thereon secured to said hood for raising said hood from the mollusk bed and for mounting it in towing position in rear of said boom end, a towing line extending from the end of said boom to the front end of said hood, pipe means connecting said hood suction hole to said suction pump and pipe means connecting said water pump with said water motor to positively rotate said brush at a greater speed than the normal rotation thereof from towing peripheral contact with said mollusk bed to positively brush the parasites from the mollusk bed and throw them into the rear portion of said hood adjacent the suction passage.

2. A device for removing starfish and other parasites from mollusk beds, comprising a hood having an open bottom and an open front end and a suction hole, runners mounted on the lower ends of each side wall thereof for movement over the mollusk bed, a brush rotatably mounted transversely thereof in peripheral contact with said mollusk bed, and a water motor for positively rotating said brush mounted thereon, a movable towing vessel having a towing outrigger boom projecting horizontally from one side of the bow thereof, a parasite storage receptacle thereon, a centrifugal suction pump, a water pump, a towing line extending from the end of said boom to the front end of said hood, pipe means connecting said hood suction hole to said suction pump and pipe means connecting said water pump with said water motor to positively rotate said brush at a greater speed than the normal rotation thereof from towing peripheral contact with said mollusk bed to positively brush the parasites from the mollusk bed and throw them into the rear portion of said hood adjacent the suction passage.

3. A device for removing star-fish and other parasites from mollusk beds, comprising a hood having an open bottom and an open front end and a suction hole, means mounted on each side thereof permitting the ready towing thereof over the mollusk bed, brush means rotatably mounted transversely thereof in peripheral contact with said mollusk bed, a movable towing vessel having a parasite storage receptacle thereon, means for towing said hook from and at a spaced distance from said movable vessel, means including a suction pump on said vessel and a suction pipe leading therefrom to said hood suction hole to provide a suction passage between said hood and parasite storage receptacle and means operable from said vessel to positively rotate said brush means at a greater speed than the normal rotation thereof from towing peripheral contact with said mollusk bed to positively brush the parasites from the mollusk bed and throw them into the rear portion of said hood adjacent the suction passage.

4. A device for removing starfish and other parasites from mollusk beds, comprising a hood having an open bottom and an open front end and a suction hole, runners mounted on the lower ends of each side wall thereof for movement over the mollusk bed, brush means rotatably mounted transversely thereof in peripheral contact with said mollusk bed, a movable towing vessel having a parasite storage receptacle thereon, means for towing said hood from and at a spaced distance from said movable vessel, means including a suction pump on said vessel and a suction pipe leading therefrom to said hood suction hole to provide a suction passage between said hood and parasite storage receptacle and means operable from said vessel to positively rotate said brush means at a greater speed than the normal rotation thereof from towing peripheral contact with said mollusk bed to positively brush the parasites from the mollusk bed and throw them into the rear portion of said hood adjacent the suction passage.

5. A device for removing starfish and other parasites from mollusk beds, comprising a hood having an open bottom and an open front end, and a suction hole, means mounted on each side thereof permitting the ready towing thereof over the mollusk bed, a brush rotatably mounted transversely thereof in peripheral contact with said mollusk bed and a water motor for positively rotating said brush mounted thereon, a movable towing vessel having a parasite storage receptacle thereon and a water pump, means for towing said hood from and at a spaced distance from said movable vessel, means including a suction pump on said vessel and a suction pipe leading therefrom to said hood suction hole to provide a suction passage between said hood and parasite storage receptacle and pipe means connecting said water pump with said water motor to positively rotate said brush at a greater speed than the normal rotation thereof from towing peripheral contact with said mollusk bed to positively brush the parasites from the mollusk bed and throw them into the rear portion of said hood adjacent the suction passage.

6. A device for removing starfish and other parasites from mollusk beds, comprising an oblong hood having an open bottom and an open front end and a suction hole, means mounted on each side thereof permitting the ready towing thereof over the mollusk bed, brush means rotatably mounted transversely thereof in peripheral contact with said mollusk bed, a movable towing vessel having a towing outrigger boom projecting horizontally from one side of the bow thereof, a parasite storage receptacle thereon and a centrifugal suction pump, a towing line extending from the end of said boom to the front end of said hood, means including a suction pump on said vessel and a suction pipe leading therefrom to said hood suction hole to provide a suction passage between said hood and parasite storage receptacle and means operable from said vessel to positively rotate said brush means at a greater speed than the normal rotation thereof from towing peripheral contact with said mollusk bed to positively brush the parasites from the mollusk bed and throw them into the rear portion of said hood adjacent the suction passage.

7. A device for removing starfish and other parasites from mollusk beds, comprising a hood having an open bottom and an open front end, and a suction hole, means mounted on each side thereof permitting the ready towing thereof over the mollusk bed, brush means rotatably mounted transversely thereof in peripheral contact with said mollusk bed and a water motor for positively rotating said brush means mounted thereon, a movable towing vessel having a parasite storage receptacle, a centrifugal suction pump and a water pump thereon, means for towing said hood from and at a spaced distance from said movable vessel, pipe means connecting said hood suction hole to said suction pump and pipe means connecting said water pump with said water motor to positively rotate said brush at a greater speed than the normal rotation thereof from towing peripheral contact with said mollusk bed to positively brush the parasites from the mollusk bed and throw them into the rear portion of said hood adjacent the suction passage.

8. A device for removing starfish and other parasites from mollusk beds, comprising a hood having an open bottom and an open front end and a suction hole, means mounted on each side thereof permitting the ready towing thereof over the mollusk bed, a movable towing vessel having a parasite storage receptacle thereon, means for towing said hood from and at a spaced distance from said movable vessel and means including a suction pump on said vessel and a suction pipe leading therefrom to said hood suction hole to provide a suction passage between said hood and parasite storage receptacle.

9. A device for removing starfish and other parasites from mollusk beds, comprising a hood having an open bottom and an open front end and a suction hole, runners mounted on the lower ends of each side wall thereof for movement over the mollusk bed, a movable towing vessel having a towing outrigger boom projecting horizontally from one side of the bow thereof, a parasite storage receptacle, and a suction pump thereon, a towing line extending from the end of said boom to the front end of a said hood and pipe means connecting said hood suction hole to said suction pump.

10. A device for removing starfish and other parasites from mollusk beds, comprising a hood having an open bottom and an open front end, and a suction hole, means mounted on each side thereof permitting the ready towing thereof over the mollusk bed, a brush rotatably mounted transversely thereof in peripheral contact with said mollusk bed, a movable towing vessel having a parasite storage receptacle thereon, means for towing said hood from and at a spaced distance from said movable vessel, means including a suction pump on said vessel and a suction pipe leading therefrom to said hood suction hole to provide a suction passage between said hood and vessel, whereby rotation of said brush caused by peripheral contact thereof with said mollusk bed on movement of said vessel may brush the parasites from the mollusk bed and throw them into the rear portion of said hood adjacent the suction passage.

11. A device for removing starfish and other parasites from mollusk beds, comprising a hood having an open bottom and an open front end, and a suction hole, runners mounted on the lower ends of each side wall thereof for movement over the mollusk bed, a brush rotatably mounted transversely thereof in peripheral contact with said mollusk bed, a movable towing vessel having a towing outrigger boom projecting horizontally from one side of the bow thereof, a parasite storage receptacle and a centrifugal suction pump thereon, a towing line extending from the end of said boom to the front end of said hood and pipe means connecting said hood suction hole to said suction pump, whereby rotation of said brush caused by peripheral contact thereof with said mollusk bed on movement of said vessel may brush the parasites from the mollusk bed and throw them into the rear portion of said hood adjacent the suction passage.

JOHN B. JACKSON.
JOHN A. McKINNON.